Patented Mar. 10, 1953

2,630,616

UNITED STATES PATENT OFFICE 2,630,616

STABILIZED ALUMINA PEBBLES

Sam P. Robinson, Bartlesville, Okla., assignor to Phillips Petroleum Company, a corporation of Delaware No Drawing. Application October 8, 1948,
Serial No. 53,589

9 Claims. (Cl. 25—156)

The invention relates to the manufacture of stabilized alpha alumina pebbles for use in pebble heaters and in other heat exchange applications. Specific aspects of the invention pertain to alumina pebbles having high breakage resistance under severe conditions of cyclic thermal and mechanical shock and high resistance to attrition in moving bed cyclic heat transfer duty, and to a method of manufacturing such pebbles. The invention also relates to the use of such pebbles in heat-exchange processes wherein heat is absorbed from a gas in one zone by a gravitating mass of pebbles and delivered to another gas in a second zone, with recycling of pebbles and concomitant thermal and mechanical shock to the pebbles.

Pebble heater techniques being developed and applied to various gas heating and reaction processes at the present time make use of a compact stream of small refractory pebbles as a moving heat-exchange medium. These pebbles which are usually ceramic materials, although they may be metallic for some applications, are spheres ranging in size from about ⅛" to 1" in diameter. They may be either catalytic or non-catalytic in a given application. In typical pebble heater operation, a continuous compact mass of pebbles descends by gravity through a series of treating zones and upon emerging from the lowermost zone, they are elevated by a suitable elevator, usually of the bucket type, to a point above the uppermost zone for again gravitating through the system. The uppermost zone is usually a pebble heating zone where the pebbles are contacted in countercurrent flow with a stream of hot combustion gas so as to raise the temperature of the pebbles to a desired degree as the pebbles descend through the heating zone. The heated pebbles then pass into a reaction or gas heating zone where they impart heat to the gas being treated and in turn are cooled and require reheating. In some installations, a feed gas preheating zone is positioned just below the reaction or gas treating zone so as to further cool the pebbles before elevation and to preheat the feed gas to the reaction zone. Other installations utilize a pebble preheating zone positioned directly above the pebble heating zone proper where the pebbles are contacted with the effluent from the reaction zone so as to recover a substantial portion of the sensible heat thereof and simultaneously quench the reaction product.

In another type of pebble heat-exchange process, a gravitating mass of pebbles is utilized to maintain a cold zone or cool a gas. The pebbles are cooled by contact with a cold gas in one chamber and the cold pebbles are then gravitated through a second chamber in contact with the gas to be cooled. In such processes the pebbles undergo great differences in temperature with the usual mechanical shock and attrition forces involved in gravitating masses of pebbles.

The pebbles of the invention are utilized to advantage in such processes as those disclosed in my copending applications Serial No. 651,293, filed March 1, 1946, involving the production of $CS_2$, and Serial No. 662,149, filed April 15, 1946, relating to the cracking of hydrocarbons to hydrogen and coke, as well as the process of the copending application of M. O. Kilpatrick, Serial No. 761,696, filed July 17, 1947, relating to the thermal conversion of hydrocarbons to more desirable hydrocarbons. These processes involve temperature changes of the order of 1000 to 2000° F. per minute, with severe mechanical shock and abrasive forces present.

The pebble heater finds its greatest utility in operations which require extremely fast heating rates and therefore extremely fast pebble cooling rates with concomitant thermal shock to the pebbles. In pebble heater processes involving more severe heating and cooling requirements, the pebbles are subjected to heating rates of as much as 1000° F. per minute and cooling rates of more than 2000° F. per minute at maximum temperatures in the neighborhood of 3000° F. In addition to the severe thermal shock resulting from such rapid temperature changes, the pebbles are subjected to considerable mechanical shock in passing through the apparatus and, especially, in the elevator equipment and in dropping from the top of the elevator into the top of the pebble heating zone. It is found that considerable breakage and loss of pebbles occur when using conventional commercial pebbles under such severe conditions of operation. Pebbles which have been made from powdered alumina, mullite, and similar materials, by wetting the powder and rolling the material in conventional balling equipment until balls of the proper size have been formed, are found to exhibit laminar structure and suffer breakage under the strain of pebble heater operating conditions. Pebbles which are made by slugging and compacting the slugs into spheres do not exhibit this laminar structure and are much more resistant to breakage under pebble heater operating conditions. However, it has been found that even when pebbles have been made by slugging and compacting the slugs into balls, they must be fired at a temperature within a critical range in order to properly bond the pebble crystals and produce a pebble which is rugged under severe conditions of service. Pure alumina pebbles require firing in the range of 3000° to 3150° F. to develop the most rugged pebble as is disclosed in my application Serial No. 23,245, filed April 26, 1948; and my application Serial No. 52,774, filed October 4, 1948, discloses a critical range for firing mullite-bonded and stabilized alumina pebbles between 2900° and 3200° F.

It is found that commercially available high purity alumina pebbles are not satisfactory for moving bed cyclic heat transfer duties for several reasons. High heating and cooling rates soon cause crystal growth of large alpha-corundum crystals at the expense of smaller bonding crystals. The pebble acquires a granular structure with development of large internal cracks. Mechanical shock crumbles these pebbles. In addition, major crystal growth occurs with surface crystals where strains are greatest. Because of high purity, these crystals are well formed and exceedingly sharp edged. Attrition losses from individual pebbles wearing upon themselves is excessive as is abrasion of handling equipment. In addition, non-uniform commercial firing and lack of appreciation of the value of closely controlled firing within narrow limits produces large quantities of pebbles poorly attrition resistant even without heat shock.

In a pebble heater process requiring the circulation of between 25,000 and 35,000 pounds of pebbles per hour with a maximum temperature shock of approximately 1000° F. per minute, the attrition and breakage loss on the best available commercially produced alumina pebble amounts to at least 200 pounds per day and runs as high as 700 pounds per day. This represents a loss of between 0.8 and 2% per day. The alumina pebbles were selected as the best available commercial pebbles. This substantial loss of pebbles due to attrition and breakage merely emphasizes the need for a rugged, attrition, and shock resistant pebble. It is with the improvement of these pebble characteristics that this invention is concerned.

The invention has several objects, viz.,

To provide an improved alumina pebble having high resistance to breakage under severe conditions of cyclic thermal and mechanical shock;

To provide a method of heat treating pebbles compacted from alumina and phosphoric acid so as to develop a better bond between crystals and stabilizes the growth of alumina crystals;

To provide a method of manufacturing thermal and mechanical shock-resistant pebbles free from laminar structure;

To provide an effective method of strengthening the bond between alumina crystals in a high purity alumina pebble; and To provide an alumina pebble highly resistant to attrition losses upon itself in continuous moving bed cyclic heat transfer apparatus.

Other objects of the invention will become apparent from a consideration of the accompanying disclosure.

The invention is concerned with a method of manufacturing high purity aluminum phosphate-bonded and stabilized pebbles and involves incorporating a substantially pure alumina mix, $P_2O_5$ between 0.1 and 10% by weight of the alumina as ortho, meta or pyrophosphoric acids or their anhydrides followed by homogenizing and compacting the mix into pebbles and calcining them at a temperature in the range of 2800° to 3200° F., preferably 2950° to 3050° F., for at least two hours and up to 24 hours. The heating in this range should be continued until the porosity of the pebble is in the range of 5 to 25 per cent, and preferably 7 to 15 per cent.

The alumina for pebbles is preferably in the form of small alpha corundum crystals and should be at least 99% pure alumina, and preferably 99.5% alumina. A typical analysis of alumina suitable for the process is as follows:

| | Percent |
|---|---|
| $Al_2O_3$ | 99.5 |
| $Na_2O$ | 0.20 |
| $Fe_2O_3$ | 0.25 |
| $SiO_2$ | 0.05 |

The alpha corundum may be made from any aluminum oxide material by suitable purification and is preferably precalcined at a temperature in the range of 1800° to 2200° F. for best results. Any of the substantially pure alumina hydrates which are readily convertible to alpha corundum upon heating to the above range may be used as the source of alumina in the pebble. Purified bauxite and the alumina manufactured by the Bayer process are examples of suitable raw materials for the alumina.

The phosphoric acid to be incorporated with the alumina mix may be in the ortho-, meta-, or pyro-form or their anhydrides, but the use of syrupy phosphoric acid (85% $H_3PO_4$) is preferred.

In the preparation of the mix from which the pebbles are to be made, it is highly desirable to comminute the alumina so that it will pass a 200 mesh screen and preferably a 325 mesh screen. In order to obtain the best results, at least 80% of the alumina should be screened or comminuted to pass a 325 mesh screen with the balance of at least 200 mesh fineness. The alumina may be powdered before or after the addition of water, and the water content of the mix should be adjusted to the range of 15 to 25% by weight before the formation of the mix into pebbles. As little as 0.1 per cent of phosphoric acid calculated as $P_2O_5$ based on the weight of the alumina substantially improves the performance of high purity alumina pebbles, but to effect desirable bonding and proper stabilization of the alpha corundum crystals, up to 10% phosphoric acid may be incorporated in the mix with desirable results.

In compacting pebbles according to the invention, the alumina mix containing between 0.1 and 10% $P_2O_5$ as phosphoric acid is thoroughly plasticized and homogenized, preferably by mixing in a muller type mill for an extended period and the moisture content is adjusted in the range of 15 to 25% in order to provide the proper consistency for extrusion. The stiff paste is then preferably extruded through dies in either a piston or screw type extrusion press into macaroni cylinders or rods which are automatically cut off into short lengths (slugs) corresponding to the diameter or cross-section of the rods so as to facilitate the balling step. Drying the paste or mix to a moisture content between 15 and 25% is necessary in order to permit proper extrusion of the paste. The moisture content of the alumina paste during the extrusion step is important because, when it amounts to less than 15%, the slugs formed from the extruded rods are not completely homogeneous in structure and will result in the formation of an inferior pebble. If the moisture content exceeds 25%, the extruded rods are too sticky and the slugs cannot be properly handled in the subsequent balling step. For best performance during this step, a moisture content of 17 to 19% by weight is desirabe. When making $\frac{5}{16}''$ pebbles, extrusion of the plastic mix into $\frac{3}{8}''$ rods and cutting into $\frac{3}{8}''$ lengths permits the compacting of the slugs into approximately $\frac{3}{8}''$ unfired pebbles. High pressure extrusion of this type with or without deairing of the feed is much preferred to other methods of preparing the slugs for the pebble balling operation to follow, inasmuch as a homogeneous body results, with minimum variations in structure after firing and avoidance of laminar structure. However, other methods of preparing the slugs are within the scope of the invention.

Following the cutting of the extruded mix into slugs, the slugs are dried to a moisture content between 10 and 15% by weight before compacting or rolling the slugs into balls, the next step of the operation. Wetter slugs tend to ball up and stick together, while dry slugs roll up into balls which develop internal cracks upon firing. A preferred moisture content for this step lies between 11.5 and 13%. Compacting of the alumina-phosphoric acid slugs into balls or pebbles can be performed in several ways. Rolling of the slugs in a balling machine utilizing three-dimensional rotation in a cylindrical drum placed at angles to all three axes of conventional rotary equipment is found to make the most suitable pebbles upon firing. The balls are more firmly compacted and more nearly spherical in shape than when made by any other known method. This is probably due to the fact that the slugs are rolled in all directions during the rolling or compacting step. The resulting spherical pebbles containing the proper amount of moisture do not stick together and may be stored temporarily or transferred directly to the firing step. The balls may be dried to desired moisture content either ahead of or during the balling operation which should continue for an average time of at least 30 minutes. Before high temperature firing, it is necessary to slowly drive off all traces of residual free $H_2O$ content. Rapid drying in the kiln might develop poor internal structure and cracks if steam were not readily and uniformly removed from the core of the pebble. The critical firing temperature of the compacted balls of alumina-phosphoric acid as stated hereinbefore, lies in the range of 2800° to 3200° F.

Considerable $P_2O_5$ combines with the more active $Al_2O_3$ as soon as mixing occurs. The resulting phosphate aids in the plasticizing and initial temporary bonding of the pebble. The completeness of the reaction will depend upon the amount of reactive $Al_2O_3$ or $Al(OH)_3$ present in in the initial mix. If none is present, additional plasticizing agents of organic or inorganic nature must be added. As the firing temperature increases, the $P_2O_5$ is substantially converted to $AlPO_4$, and residual unreacted $Al_2O_3$ is slowly converted to alpha corundum. When crystal development of such, normally becomes rapid around 2800–2900° F., the $AlPO_4$ begins to soften or melt to a very viscous high temperature glass which effectively coats and separates major portions of the unreacted alumina and effectively stabilizes alpha corundum crystal growth. At lower operating temperatures, $AlPO_4$ is a very strong and effective bonding agent for $Al_2O_3$ crystals. The temperature and length of firing ordinarily determine the porosity of the pebble, but when an organic binding material is incorporated in the pebble mix to aid in the pebble balling operation, the amount of organic binding material incorporated therein determines to some extent the porosity of the pebble. The firing should be continued in the range of 2800° to 3200° F. at least two hours and until the porosity of the pebble lies in the range of 7 to 15%. The term "porosity" is intended to include both the connected and sealed off pore space. When properly fired $\frac{5}{16}''$ pebbles have a crushing strength exceeding 1000 pounds applied to parallel plates.

Firing or calcination of the pebbles can be suitably effected in any conventional equipment which results in maintaining the entire mass of pebbles at a relatively even temperature within the specified range. Batch firing in continuous shaft kilns produces pebbles which are inferior in service in pebble heater operation because they are not uniformly heated in all parts of the bed, a large proportion being either underfired or overfired. The former are not strong and stand up poorly to both heat and mechanical shock, while the latter are too rigid and soon develop cracks along large crystal faces which results in early breakage in service. Neither are attrition resistant.

The following examples illustrate two specific modifications of the invention and are not to be construed as unduly limiting the invention:

*Example I*

47 lbs. of 85% $H_3PO_4$ are added to 900 lbs. of Bayer process alumina precalcined to 2100° F. and 60 lbs. of purified but active light calcined $Al_2O_3$ and enough water to produce a stiff paste of 16% $H_2O$ content after intensive mixing in a mulling pan mixer. This material is extruded without deairing in a piston type extrusion press equipped with dies and automatic knives to prepare $\frac{3}{8}''$ diameter by $\frac{3}{8}''$ long slugs. These are tumbled into spheres in a three dimensionally rotated tumbling drum swept with flue gas to produce balls with 12% moisture content after 30 minutes' tumbling. These are dried in a waste heat or Dutch oven type dryer before calcining for 12 hours at 3000° F. in a tunnel kiln. A pebble of final composition of approximately 5% $AlPO_4$–95% $Al_2O_3$ is produced having very desirable heat and mechanical shock and attrition resistant properties. Porosity is reduced to 10 to 12%; alpha corundum crystals average under 25 microns in size; and crushing strength in $\frac{5}{16}''$ diameter pebbles applied between parallel plates exceeds 1500 lbs. Surface crystals are small and essentially bedded in $AlPO_4$ material.

*Example II*

30 lbs. of $P_2O_5$, 900 lbs. of precalcined (1800–2200° F.) Bayer process alumina and 70 lbs. of light reactive alumina are mixed with enough water to produce a stiff paste of 18% $H_2O$ content. Paste is processed as in Example I after extrusion in an auger type deairing extrusion press. Final product is burned in a periodic kiln 4 hours at 3100° F. Essentially the same type of pebble is produced as that of Example I.

Certain modifications of the invention will become apparent to those skilled in the art and the illustrative details disclosed are not to be construed as imposing unnecessary limitations on the invention.

I claim:

1. A process for manufacturing stabilized alumina contact material in the form of pebbles capable of withstanding cyclic thermal and mechanical shock over long periods without breakage and highly attrition resistant, which comprises compacting ⅛" to 1" spheres from finely comminuted active alumina and phosphoric acid in which the phosphoric acid (calculated as $P_2O_5$) amounts to between 0.1 and 10% by weight of the alumina; slowly drying said spheres; and calcining the dried spheres at a temperature in the range of 2800° to 3200° F. for at least 2 hours and until the porosity lies in the range of 5 to 25%.

2. A process for manufacturing stabilized alumina contact material in the form of pebbles capable of withstanding cyclic thermal and mechanical shock over long periods without breakage and highly attrition resistant, which comprises forming a homogeneous plastic mix of finely comminuted active alumina of at least 99% purity and phosphoric acid suitable for extrusion into rods, the phosphoric acid (calculated as $P_2O_5$) amounting to between 0.1 and 10% by weight of the alumina; extruding said mix into rods ⅛" to 1" in diameter; cutting said rods into slugs between ⅛" and 1" in length; compacting the slugs into balls; and calcining said balls at a temperature in the range of 2800° to 3200° F. for at least 2 hours and until the porosity lies in the range of 7 to 15%.

3. The process of claim 2 in which the balls are calcined in the range of 2950° to 3050° F.

4. A process for manufacturing stabilized alumina contact material in the form of pebbles capable of withstanding cyclic thermal and mechanical shock over long periods without breakage, which comprises forming a homogeneous aqueous plastic mix of finely comminuted active alumina, phosphoric acid, and water in which the phosphoric acid (calculated at $P_2O_5$) amounts to between 0.1 and 10% by weight of the alumina; adjusting the water content to the range of 15 to 25% by weight of the mix; forming the mix into slugs suitable for compacting in ⅛" to 1" balls; drying said slugs to a water content in the range of 10 to 15% by weight; compacting the partially dried slugs into balls; and calcining the balls at a temperature in the range of 2800° to 3200° F. for at least 2 hours and until the porosity lies in the range of 7 to 15%.

5. The process of claim 4 in which an organic binder is incorporated in the mix in an amount between 2 and 10% by weight thereof.

6. A process for manufacturing stabilized alumina contact material in the form of pebbles capable of withstanding cyclic thermal and mechanical shock over long periods without breakage, which comprises forming a homogeneous, aqueous, plastic mix of finely divided active alumina at least 80% of which passes a 325 mesh screen, phosphoric acid, and water, in which the acid (calculated as $P_2O_5$) amounts to between 0.1 and 10% by weight of the alumina; adjusting the water to the range of 15 to 25% by weight of the mix; extruding the mix into ⅛" to 1" rods; dividing the rods into slugs ⅛" to 1" in length; drying the slugs to a water content in the range of 10 to 15% by weight; compacting the partially dried slugs into balls by rolling and tumbling; slowly drying the balls to a water content less than 1%; and calcining the dried balls at a temperature of 2950° to 3050° F. for at least 2 hours and until the porosity lies in the range of 7 to 15% thereby forming $AlPO_4$ in situ and stabilizing growth of alpha alumina crystals in the balls up to the calcining temperature.

7. The process of claim 6 in which a volatile organic binder is incorporated in the mix in an amount between 2 and 10% by weight thereof.

8. A method of heat treating pebbles compacted from a moist mix of alumina and phosphoric acid so as to improve the attrition and breakage resistance thereof under severe conditions of cyclic thermal and mechanical shock, which comprises slowly drying said pebbles and calcining the dried pebbles at a temperature in the range of 2800° to 3200° F. for at least 2 hours and until the porosity thereof lies in the range of 7 to 15%, thereby forming $AlPO_4$ in situ and stabilizing the alumina crystals against further growth at temperatures up to the calcining temperature.

9. A stabilized alumina pebble produced by the process of claim 1 and consisting essentially of 80 to 99.8 weight per cent alumina, 0.2 to 19 weight per cent aluminum phosphate, and not over 1 weight per cent other materials, the aluminum phosphate being dispersed uniformly throughout the pebble so as to form a substantially homogeneous composition, the alumina crystals being of an average size of less than 25 microns, said pebble having a crushing strength of at least 1000 pounds (based on a 5/16" pebble).

SAM P. ROBINSON.

REFERENCES CITED

The following references are of record in the file of this patent:

UNITED STATES PATENTS

| Number | Name | Date |
|---|---|---|
| 1,949,038 | Caven | Feb. 27, 1934 |
| 2,007,742 | Brown | July 9, 1935 |
| 2,035,845 | Stanton | Mar. 31, 1936 |
| 2,061,099 | Morgan | Nov. 17, 1936 |
| 2,304,133 | Wilson et al. | Dec. 8, 1942 |
| 2,389,636 | Ramseyer | Nov. 27, 1945 |
| 2,463,979 | Langrod | Mar. 8, 1949 |